United States Patent [19]

Climenhage

[11] 4,315,821

[45] Feb. 16, 1982

[54] TREATMENT OF NITROGENOUS WASTES

[75] Inventor: David C. Climenhage, Kingston, Canada

[73] Assignee: Du Pont Canada Inc., Mississauga, Canada

[21] Appl. No.: 949,433

[22] Filed: Oct. 10, 1978

Related U.S. Application Data

[63] Continuation-in-part of Ser. No. 538,757, Jan. 6, 1975, abandoned, which is a continuation-in-part of Ser. No. 390,414, Aug. 22, 1973, abandoned.

[51] Int. Cl.³ .............................................. C02F 3/30
[52] U.S. Cl. ................................. 210/605; 210/623; 210/624; 210/903
[58] Field of Search ....................................... 210/2–9, 210/11, 12, 14–18, DIG. 28, 601, 605, 620, 621, 623, 624, 626, 631, 903

[56] References Cited

U.S. PATENT DOCUMENTS

| | | | |
|---|---|---|---|
| 2,875,151 | 2/1959 | Davidson | 210/16 |
| 3,607,736 | 3/1969 | Yusho | 210/11 |
| 3,654,147 | 4/1972 | Levin et al. | 210/6 |
| 3,817,857 | 6/1974 | Torpey | 210/16 |
| 3,953,327 | 4/1976 | Parker | 210/7 |
| 3,964,998 | 6/1976 | Barnard | 210/DIG. 28 |

FOREIGN PATENT DOCUMENTS

47-17266 9/1972 Japan .

OTHER PUBLICATIONS

Johnson et al., "Nitrogen Removal by Nitrification & Denitrification", *WPCFJ*, pp. 1015–1036, 8/1964.
Babbit et al., *Sewerage & Sewage Treatment*, pp. 661–662.
St. Amant et al., "Treatment of High Nitrate Waters", *JAWWA*, 12/1969, pp. 659–662.
Lvdzack et al., "Controlling Operation to Minimize Activated Sludge Effluent Nitrogen", *WPCFJ*, 9/1962, pp. 920–931.

*Primary Examiner*—Peter A. Hruskoci

[57] ABSTRACT

An improved process is disclosed for the treatment of aqueous waste streams containing nitrogenous matter (nitrate or nitrite ions or matter capable of forming nitrate and nitrite ions) in the presence of sufficient carbonaceous matter to permit substantially complete denitrification of the aqueous effluent. The process comprises introducing an aqueous waste stream having a pH less than 6 into an anaerobic treatment zone containing anaerobic activated sludge at a rate such that the concentrations of nitrate and nitrite ions in the anaerobic treatment zone are maintained at a level less than 3 milligrams/liter. In embodiments, the effluent from the anaerobic treatment zone is passed to an aerobic treatment zone effluent from which is recycled at a rate at least equal to that at which untreated waste is fed to the anaerobic treatment zone. The waste stream feed may contain phenol.

4 Claims, 5 Drawing Figures

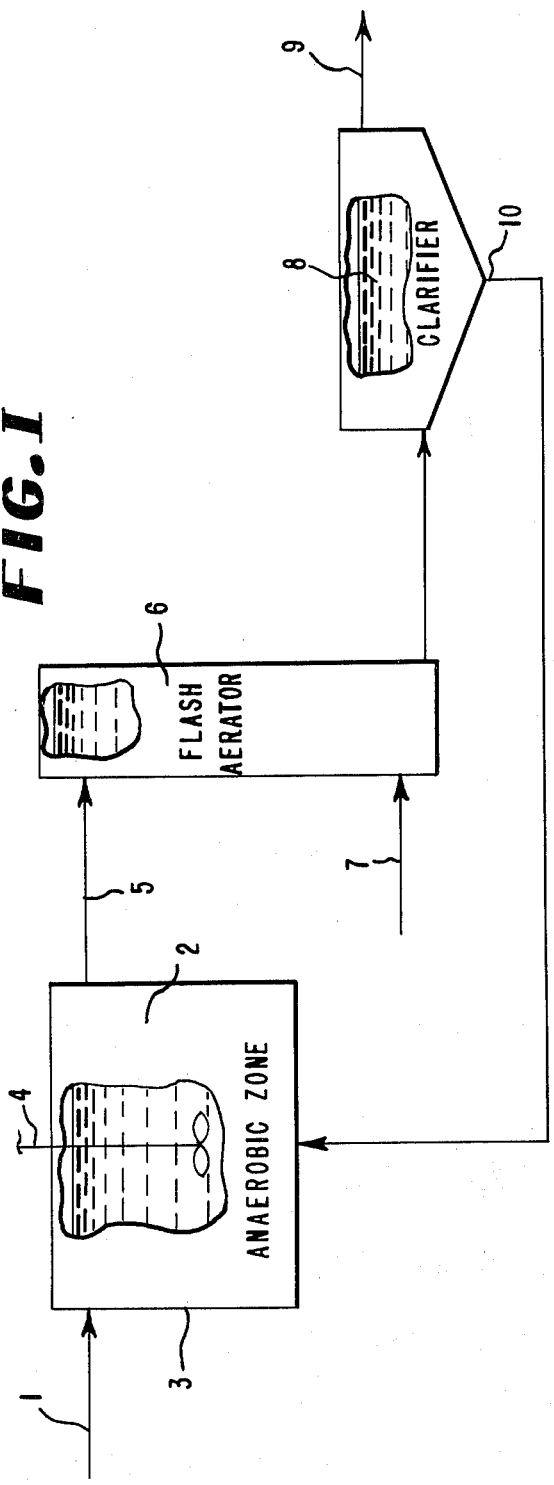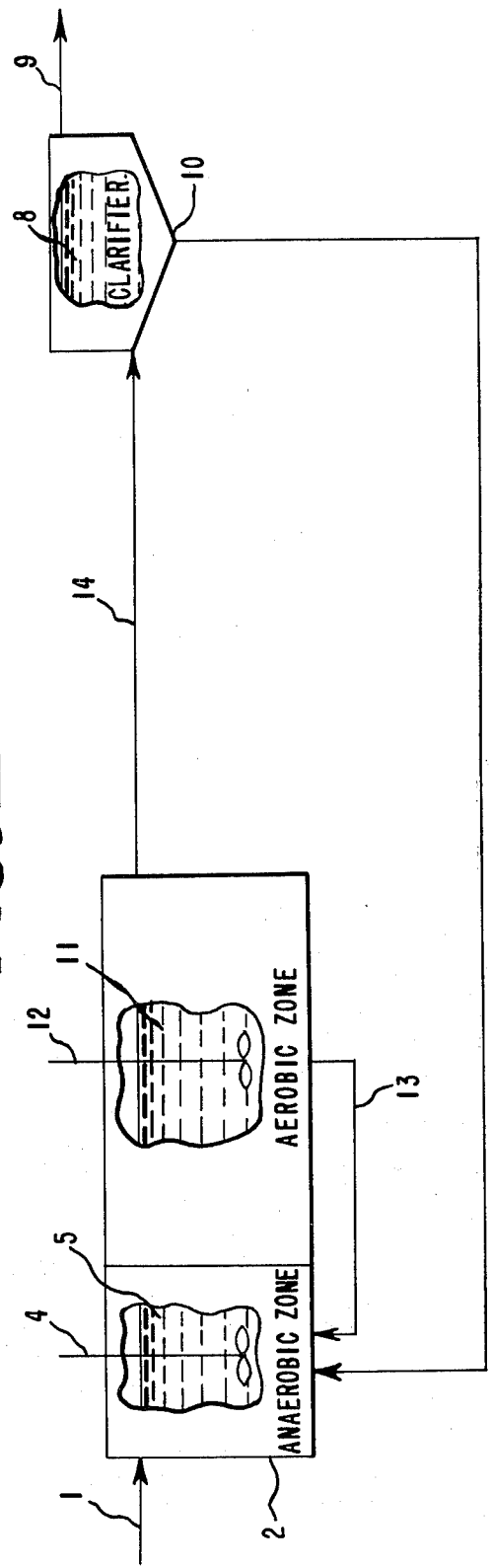

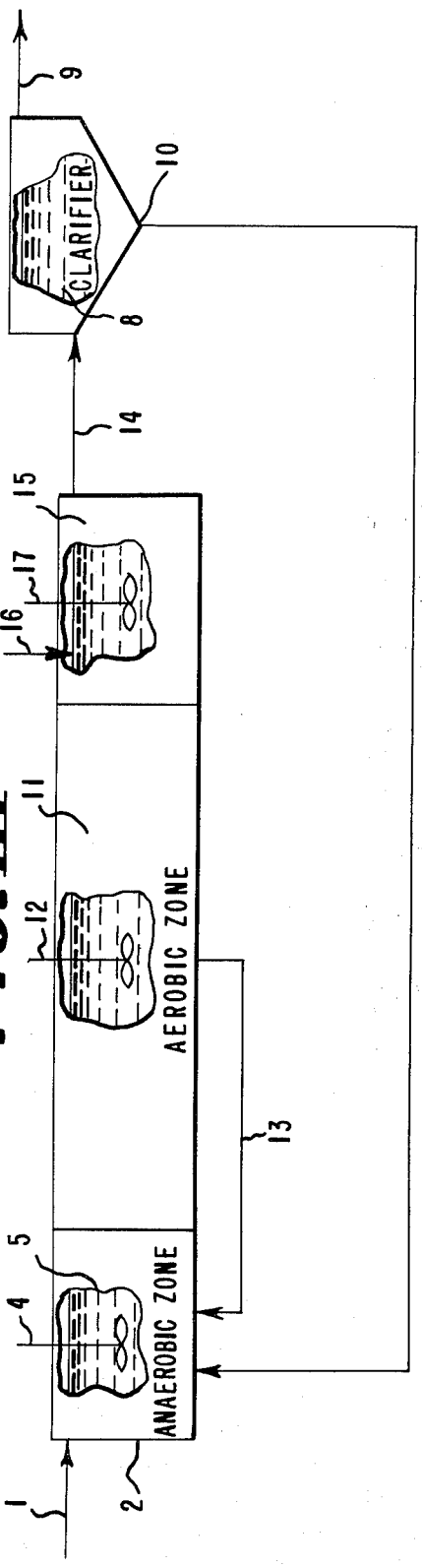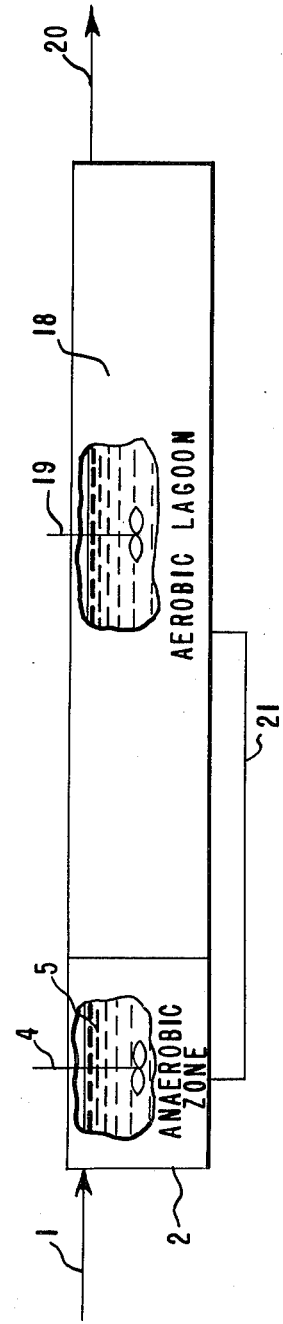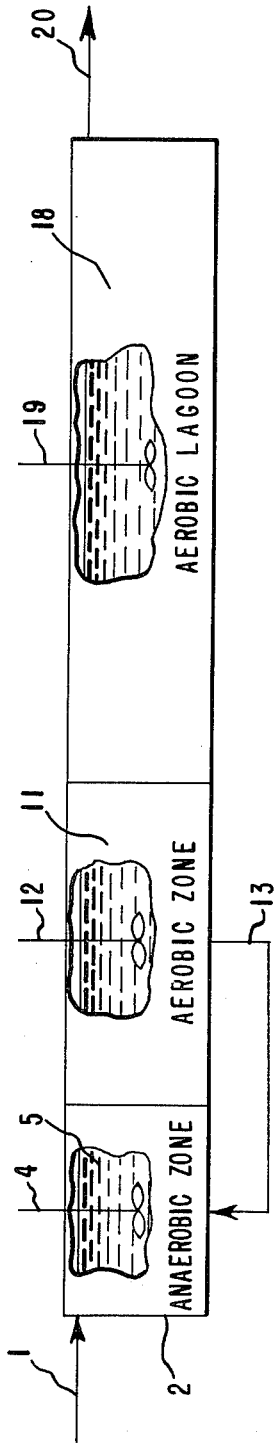

TREATMENT OF NITROGENOUS WASTES

CROSS-REFERENCE TO RELATED APPLICATIONS

This application is a continuation-in-part of copending application Ser. No. 538,757, filed Jan. 6, 1975, now abandoned which is a continuation-in-part of Ser. No. 390,414, filed Aug. 22, 1973, now abandoned.

BACKGROUND OF THE INVENTION

The present invention relates to an improved process for the treatment of effluents and, in particular, to a biological process for the treatment of aqueous effluent wastes containing nitrogenous matter in the presence of carbonaceous matter.

Nitrogenous compounds, for example nitrate ions, nitrite ions, amines and/or ammonia are present in effluents obtained from many sources. Aqueous effluents from industrial sites, for example multi-product chemical plants, may contain carbonaceous and nitrogenous matter, e.g. nitric acid, ammonium nitrate, and the composition of these waste streams will depend on the source of the particular effluent. Effluents may contribute significantly to the pollution of lakes and streams, destruction of animal and plant life and may result in health hazards.

Chemical processes for the treatment of effluents are known. For example, a process for the treatment of effluent containing carbonaceous and nitrogenous matter in the presence of water at an elevated temperature is described in U.S. Patent Application Ser. no. 240,226, filed Mar. 31, 1972.

Biological processes for the treatment of aqueous effluents are also known. The conventional "activated sludge process" is an aerobic process in which an aqueous waste stream is contacted with activated sludge usually with accompanying aeration. Such a process may be adequate to remove carbonaceous matter from effluents but it may fail in the removal of nitrogenous matter, for example ammonia and nitrite ions, which it may only convert into a different form of nitrogenous matter, for example nitrate ions.

Biological processes are known for the denitrification of nitrogenous matter. For example, see "Nitrogen Removal by Nitrification and Denitrification", Walter K. Johnson and George J. Schroepfer, *Water Pollution Control Federation Journal*, Vol. 30 (August, 1964) No. 8, p. 1015–1036. An anaerobic process for the denitrification of nitrocellulose waste is described by K. Mudrack in "Nitro-Cellulose Industrial Waste", *Purdue University Engineering Bulletin*, Extension Service #121, 1966. Anaerobic denitrification processes are sensitive to the pH of the stream and it is preferred if the stream entering the denitrification process has been neutralized.

Another biological process for treating nitrates in aqueous streams is described by W. Haltrich in "Elimination of Nitrate from an Industrial Waste", *Proceedings Purdue Industrial Waste Conference*, May, 1967. In this process, the industrial waste containing the nitrate is mixed with activated sludge in an unaerated stage to split the nitrate followed by treatment in an aeration stage. In the article "Controlling Operation to Minimize Activated Sludge Effluent Nitrogen", *Journal of Water Pollution Control Federation* 34, 1962 pages 920–31, the authors L. J. Ludzack and M. B. Ettinger describe other biological processes for treating nitrogen-rich effluents.

In order to overcome injurious effects of phenols on bacteria under anaerobic conditions, Todhunter et al. in Canadian Patent No. 620,366 which issued May 16, 1961, disclosed and claimed a process in which phenols are treated aerobically prior to anaerobic treatment of ammonia.

SUMMARY OF THE INVENTION

An improved denitrification process has now been found. In particular, an improved process which is less sensitive to the effects of an aqueous effluent stream of pH less than about 6.0 and/or to the chemical nature of carbonaceous or nitrogenous matter present in the effluent has been found.

Accordingly, the present invention provides an improved process for the treatment of aqueous waste streams containing nitrogenous matter selected from the group consisting of nitrate and nitrite ions and matter capable of forming nitrate or nitrite ions, a substantial portion of the acidic component of the aqueous waste stream being nitrogenous matter, in the presence of sufficient carbonaceous matter to permit substantially complete denitrification of the aqueous waste, said process comprising introducing the aqueous waste feed into an anaerobic treatment zone containing anaerobic activated sludge at a rate such that the concentrations of nitrate and nitrite ions in the anaerobic treatment zone are maintained at a low level.

The concentration of nitrogen in the form of nitrate and nitrite ions is maintained below about 3 milligrams/liter, and in particular below about 1 milligram/liter.

In a further embodiment, the treated effluent from the anaerobic zone is allowed to pass to a second treatment zone and especially to a second treatment zone in which sludge may be separated and from which a mixture of sludge and effluent may be recycled to the anaerobic zone.

In particular embodiments, the second zone may be a clarification zone or an aerobic treatment zone.

In yet another embodiment, the present invention provides an improved process for the treatment of aqueous wastes containing nitrogenous matter selected from the group consisting of nitrate and nitrite ions and matter capable of forming nitrate or nitrite ions in the presence of sufficient carbonaceous matter to permit substantially complete denitrification of the effluent, said process comprising treating the aqueous waste stream with an anaerobic activated sludge in an anaerobic treating zone, passing the treated effluent therefrom to an aerobic treatment zone, separating and recycling a mixture of sludge and treated waste from the aerobic treatment zone to the anaerobic treatment zone at a rate (basis volume) at least as high as the rate of introduction of aqueous effluent into the anaerobic treatment zone, the recycle containing 1000–5000 milligrams/liter of volatile suspended solids.

In a still further embodiment the loading of reduced nitrogen compounds fed to the aerobic zone is less than about 0.1 lb. of reduced nitrogen per pound of volatile suspended solids per day, reduced nitrogen being defined hereinafter.

As described hereinabove, the process of the present invention relates to the treatment of aqueous wastes containing nitrogenous and carbonaceous matter. The nitrogenous matter may be in the form of nitrate or nitrite ions or matter capable of forming nitrate or nitrite ions, for example ammonia, amines and the like, the latter being referred to herein as reduced nitrogen compounds. The carbonaceous matter should be present in at least the amount required for complete denitrification of the effluent. The carbonaceous matter may be present in the aqueous effluent fed to the anaerobic reactor or added separately to the anaerobic reactor and may be obtained from any convenient source, for example municipal sewage, industrial waste or a carbonaceous liquid, for example methanol. The aqueous waste may be obtained from any suitable source, for example from industrial sites.

The expression "substantial portion of the acidic component of the aqueous waste being nitrogenous matter" as used herein within the context of the invention refers to the relative quantity of nitrogenous and non-nitrogenous materials contained in the acidic component of the waste feed stream. More particularly, the expression refers to the ratio of nitrogenous to non-nitrogenous acidic materials below which a pH below about 6.0 would be imparted to the contents of the anaerobic zone and the effluent therefrom upon decomposition of the nitrogenous acid component during the process of the invention. Thus, if the concentration of non-nitrogenous acidic materials remaining in the anaerobic zone after decomposition of the nitrogenous acidic materials is sufficient to turn the anaerobic zone "sour", i.e. to impart a pH below about 6.0, then the feed contained less than a substantial portion of nitrogenous acidic materials. On the other hand, if after decomposition of the nitrogenous acidic materials the anaerobic zone remains "sweet", i.e. it still has a pH of no less than about 6.0, the feed contained a substantial portion of nitrogenous acidic materials. Either condition is easily determined by routine pH measurement of the contents of the anaerobic zone and the "sour" condition is readily corrected by adjusting the relative amounts of nitrogenous and non-nitrogenous acids contained in the feed.

DESCRIPTION OF THE DRAWINGS

FIG. I is a schematic representative of a denitrification process having a clarification device as the second zone;

FIG. II is a schematic representation of a denitrification process having a high rate aerobic zone and a clarification zone after the anaerobic zone;

FIG. III is a schematic representation of a variation on the process of FIG. II;

FIG. IV is a schematic representation of a denitrification process having an aerobic lagoon effluent treatment zone as the second zone;

FIG. V is a schematic representation of a denitrification process having a high rate aerobic effluent treatment zone followed by a low rate aerobic lagoon effluent treatment zone.

DESCRIPTION OF THE INVENTION

In FIG. I, an aqueous waste stream 1 is fed to an anaerobic treatment zone 2 which is comprised of a tank 3 having a stirrer 4. A portion of the effluent from anaerobic treatment zone 2 is passed through pipe 5 to an upper section of flash aerator 6. Air is introduced into the bottom of the flash aerator 6 through inlet 7. The flash aerator 6 is used to facilitate removal of nitrogen bubbles on sludge passing from anaerobic treatment zone 2; the operation of flash aerators is well known.

Effluent from flash aerator 6 is passed to clarifier 8; the design and operation of clarifier also being well known. Clarifier-treated liquid effluent 9 is removed from the top of clarifier 8 while mixed recycle sludge and liquid effluent is taken from the bottom 10 of clarifier 8 and fed to anaerobic treatment zone 2.

The feed rate of the waste stream 1 in the embodiment of FIG. I, and in the embodiments disclosed hereinafter, is preferably adjusted so that the concentration of nitrate and nitrite ions in the anaerobic treatment zone 2 is maintained at a low level. Moreover, it is important that the anaerobic treatment zone 2 contain sufficient carbonaceous matter to permit substantially complete denitrification of the waste feed 1. It may, therefore, be necessary to add carbonaceous matter to the process preferably to the feed stream 1 or directly into the anaerobic treatment zone 2. Excess carbonaceous matter may be treated subsequently, especially by the processes described hereinafter. Waste feed streams may be obtained from more than one source and such feeds may contain differing levels of nitrogenous and carbonaceous matter. The waste feeds may be fed separately or mixed prior to being fed to the anaerobic treatment zone 2.

As stated hereinabove, the waste feed rate to the anaerobic zone is adjusted so that the concentration of nitrite and nitrate ions in the anaeorbic treatment zone 2 is maintained at a low level. Such low levels may depend on the particular composition of the feed thereto but the concentration of nitrogen in the form of nitrite and nitrate are less than about 3 milligrams/liter. In preferred embodiments, the concentration of nitrogen is less than 1 milligram/liter.

The process shown in FIG. I and the embodiments shown threinafter are operable at a waste feed pH significantly below 6.0 and in particular at a pH as low as 2.0 provided that a substantial proportion of the acid is nitric acid which may be subsequently removed by the denitrification process. The presence of substantial quantities of other acids, for example hydrochloric and sulphuric acids, may result in the pH of the contents of the anaerobic zone being decreased below about 6.0.

In the embodiment shown in FIG. II, the effluent passing from anaerobic treatment zone 2 is fed to a high rate aerobic treatment zone 11 having a stirrer 12. A portion of the effluent from aerobic treatment zone 11 is recycled through pipe 13 to anaerobic treatment zone 2 while the remainder of the effluent from this zone is passed by pipe 14 to clarifier 8. Clarified liquid effluent 9 is removed from the top of clarifier 8 while recycle sludge and liquid effluent is taken from the bottom 10 of clarifier 8 and fed to anaerobic treatment zone 2.

Nitrification of nitrogenous matter, for example, of amines and ammonia, may occur in the aerobic treatment zone 11. In this case, the mixture of liquid effluent and sludge taken from the bottom of aerobic treatment zone 11 may contain nitrate and/or nitrite ions which may be utilized in anaerobic treatment zone 2. In order to remove the nitrate and nitrite ions efficiently, it is necessary to recycle the mixture of sludge and effluent from aerated zone 11 at a rate (basis volume) at least as great as the rate of the introduction of waste feed 1 to anaerobic treatment zone 2. In particular, the recycle rate should be one to four times as great as the feed rate. The use of an aerobic zone and the high recycle rate may permit efficient treatment of effluents containing nitrogenous matter other than nitrate and nitrite ions.

When the recycle rate is as great as the feed rate, it would be predicted that the treatment efficiency for a waste feed stream comprising reduced nitrogen compounds would be 50% for the embodiment shown in FIG. II. However, in the examples hereinafter it is shown that higher efficiencies are obtained, indicating that some denitrification may occur in the aerobic zone. Inefficient mixing and/or settled sludge may enhance this effect. The aerobic zone may be designed to take such factors into account.

It may be desirable, for example, for the treatment of waste streams having a large proportion of the nitrogenous matter in the form of ammonia or derivatives of ammonia to have a second anaerobic treatment zone 15 between the high rate aerobic treatment zone 11 and clarifier 8 of the embodiment shown in FIG. II, as is illustrated in the embodiment shown in FIG. III. In this embodiment, it may be necessary to add an additional source of bio-degradable carbon 16 to the second anaerobic treatment zone 15, a suitable source of bio-degradable carbon being methanol or a carbonaceous effluent. The second anaerobic treatment zone 15 is preferably stirred by stirrer 17. Effluent from the second anaerobic treatment zone is fed through pipe 14 to clarifier 8. A second anaerobic treatment zone may be desirable if a level of treatment of the effluent greater than that attainable in the first anaerobic treatment zone 2 and in the high rate aerobic treatment zone 11 is required.

The aerobic treatment zone may be in the form of an aerated lagoon, as is shown in the embodiment shown in FIG. IV. The operation of aerobic lagoons is known, see for example Chapter 10 of "Water Pollution Control, Experimental Procedures for Process Design" by W. W. Eckenfelter and D. L. Ford, The Pemberton Press, 1970. Effluent from anaerobic treatment zone 2 is fed to aerobic lagoon 18 which has a stirrer 19. Treated effluent 20 is discharged. A mixture of sludge and effluent is recycled by pipe 21 to anaerobic treatment zone 2.

A variation of the embodiment of FIG. IV is shown in FIG. V. In the latter embodiment, a high rate aerobic treatment zone 11 of the type described in the embodiment of FIG. II has been placed between anaerobic treatment zone 2 and aerobic lagoon 18.

At low concentrations of carbonaceous and nitrogenous matter in the anaerobic zone the concentration of dissolved oxygen in the anaerobic zone may be important. Techniques for controlling the concentration of dissolved oxygen are known. For example the anaerobic zone may be covered, for example by a lid or an inert buoyant material may be allowed to float on the surface of the effluent in the anaerobic zone.

The operation of high rate aerobic treatment zones and of aerobic lagoons is known. The solids level, i.e., the bacteria concentration, is higher in a high rate aerobic treatment zone and this type of treatment zone may be less sensitive to temperature changes than an aerobic lagoon, and may even show similar effluent treatment efficiencies at all times of the year. Such an embodiment may be preferred in locations experiencing cold winters.

The anaerobic zone is operated so that nitrogen is introduced in the aqueous waste stream at a rate of less than 0.7, and in particular less than 0.3, lb. nitrogen/lb. of volatile suspended solids in the anaerobic zone/day. This concentration is referred to in the examples as the nitrogen loading factor.

The reduced nitrogen compounds fed to the aerobic zone, referred to in the examples as the nitrification loading factor, is preferably less than 0.1 lb. nitrogen/lb. of volatile suspended solids in the aerobic zone/day. The BOD fed to the aerobic zone, referred to in the examples as the BOD loading factor, is preferably less than 0.25 lb. BOD/lb. of volatile suspended solids in the aerobic zone/day.

The loading factors are calculated using the concentrations of, for example nitrogen, and of volatile suspended solids and the retention time of the feed stream in the treatment zone.

In operating the process of the present invention it may be desirable to condition the bacteria, i.e. to allow acclimation of the sludge, in the process for a period of time by operating the process at low BOD loading factors during the initial period of operating. Suitable BOD loading factors are 0.10–0.15 lb. BOD/lb. of volatile suspended solids in the aerobic zone/day. The period of time during which the process is operated at such low BOD loading factors may vary with the effluent fed to the process and with the source of bacteria. As is exemplified hereinafter such periods of time may be of the order of one month. Subsequently, after acclimation of the sludge has occurred, the BOD loading factor may be increased over a further period of time, for example, several weeks, to the desired operating level.

In the aerobic zone the concentration of dissolved oxygen is preferably 2–4 milligrams/liter.

Bacteria for use in the process of the present invention may be obtained by the acclimation of sludge from a sanitary treatment process. This is preferably accomplished by introducing the sludge into a dilute waste under anaerobic conditions and subsequently gradually, for example over a period of several weeks, increasing the concentration of matter in the feed. Other sources of denitrifying bacteria are known. Bacteria may also be obtained by acclimation of sludge in the process of the present invention. For example, a dilute waste stream may be fed to an anaerobic zone containing sludge. Effluent from the anaerobic zone may be fed to an aerobic zone and a mixture of sludge and effluent recycled to the anaerobic zone. The concentration of carbonaceous and nitrogenous matter in the feed to the anaerobic zone should be gradually increased, for example, over a period of several weeks, to the desired level. The efficiency of the treatment process during the period of acclimation of the bacteria may be less than the efficiency subsequent to acclimation of the bacteria.

It may be necessary to add phosphate or the like to the effluent to promote growth of the bacteria, as is known.

The present invention may be illustrated by the following examples.

EXAMPLE I

The waste treatment process shown in FIG. I was operated on a laboratory scale using a waste stream from a nylon intermediates industrial plant. The aqueous waste contained nitric acid, adipic acid, hexamethylene diamine, ammonia (in the form of ammonium salts), ketones, alcohols, hydrocarbons and the like. Averaged results for two periods are given in Table I. Ambient temperature was 22° C. in this example and in all examples following.

TABLE I

| | Period 1 | Treatment Level | Period 2 | Treatment Level |
|---|---|---|---|---|
| Days | 15 | | 17 | |

TABLE I-continued

|  | Period 1 | Treatment Level | Period 2 | Treatment Level |
|---|---|---|---|---|
| Feed* |  |  |  |  |
| nitrate | 660 |  | 630 |  |
| nitrite | 70 |  | 50 |  |
| TOC** | 1020 |  | 990 |  |
| pH | 2.0–2.5 |  | 2.0–2.5 |  |
| Treated Effluent* |  |  |  |  |
| nitrate | 1 | 99 | 0.5 | 99 |
| nitrite | 0 |  | 0 |  |
| TOC | 180 | 81 | 190 | 82 |
| pH | 7.5–8.0 |  | 7.5–8.0 |  |
| Sludge Level*** | 8050 |  | 6000 |  |
| Nitrogen Loading Factor**** | 0.22 |  | 0.27 |  |

*in milligrams/liter
**Total organic carbon, measured as carbon
***(milligram/liter VSS), VSS = volatile suspended solids
****in lb. nitrogen/lb. VSS/day Total Organic Carbon is defined as the difference between total carbon and inorganic carbon and was obtained using a Beckman Carbon Analyzer.

Nitrate, nitrite and ammonia were determined by known techniques. Reduced nitrogen compounds, identified in the Tables hereinafter as N-H compounds, are defined as the difference between total nitrogen and the total of the nitrate and nitrite compounds. Total nitrogen was obtained by contacting a test sample with a nickel catalyst at high temperature (about 600° C.) in the presence of hydrogen. The ammonia thereby produced was contacted with water and measured using a Coulson conductivity detector.

All analyses for nitrogen compounds are reported as nitrogen in milligrams/liter. Similarly carbon analyses are reported as carbon in milligram/liter.

Treatment level is defined as the degree of treatment between the feed and the effluent, expressed as a percentage.

EXAMPLE II

An aqueous waste stream was treated on a laboratory scale using the process shown in FIG. V. The feed stream was similar to that used in Example I. The data were averaged for two periods and the results are given in Table II. The recycle rate was the same as the feed effluent rate.

TABLE II

|  | Period 1 | Treatment Level | Period 2 | Treatment Level |
|---|---|---|---|---|
| Days | 19 |  | 25 |  |
| Feed* |  |  |  |  |
| nitrate | 130 |  | 110 |  |
| nitrite | 55 |  | 45 |  |
| N—H Compounds | 185 |  | 170 |  |
| TOC | 990 |  | 1130 |  |
| Anaerobic Stage* |  |  |  |  |
| nitrate & nitrite | 0 |  | 0 |  |
| N—H Compounds | 95 |  | 80 |  |
| TOC | 380 |  | 490 |  |
| Sludge Level** | 250 |  | 240 |  |
| Nitrogen Loading Factor | 0.68 |  | 0.68 |  |
| Aerobic (1st) Stage* |  |  |  |  |
| nitrate & nitrite | 40 |  | 20 |  |
| N—H Compounds | 50 |  | 40 |  |
| TOC | 140 |  | 185 |  |
| Sludge Level | 380 |  | 370 |  |
| Nitrification Loading Factor*** | 0.1 |  | 0.1 |  |
| BOD Loading Factor**** | 0.76 |  | 1.4 |  |
| Aerobic (2nd) Stage* |  |  |  |  |
| nitrate & nitrite | NA |  | 32 | 80 |
| N—H Compounds | NA |  | 15 | 91 |
| TOC | NA |  | 95 | 92 |
| Sludge Level |  |  | 36 |  |

*in milligram/liter
NA - not analyzed
**(milligram/liter VSS), VSS = volatile suspended solids
***in lb. nitrogen/lb. VSS/day
****in lb. BOD/lb. VSS/day.

EXAMPLE III

The process illustrated in FIG. II was operated on a laboratory scale with a waste stream of the type used in Example I. The results are given in TABLE III. The recycle rate from the clarifier to the anaerobic treatment zone was the same as the feed effluent rate. BOD was measured by standard techniques.

TABLE III

|  | Period 1 | Treatment Level | Period 2 | Treatment Level |
|---|---|---|---|---|
| Days | 14 |  | 26 |  |
| Feed Effluent* |  |  |  |  |
| nitrate | 120 |  | 120 |  |
| nitrite | 35 |  | 15 |  |
| N—H Compounds | 155 |  | 150 |  |
| TOC | 1120 |  | 995 |  |
| Anaerobic Stage* |  |  |  |  |
| nitrate & nitrite | 0 |  | 0 |  |
| N—H Compounds | 55 |  | 75 |  |
| TOC | 420 |  | 360 |  |
| BOD** | 690 |  | 715 |  |
| Nitrogen Loading Factor | 0.5 |  | 0.2 |  |
| Aerobic Stage* |  |  |  |  |
| nitrate & nitrite | 25 |  | 50 |  |
| N—H Compounds | 20 |  | 7 |  |
| TOC | 75 |  | 60 |  |
| Sludge Level*** | 570 |  | 1360 |  |
| BOD | 11 |  | 13 |  |
| Nitrification Loading Factor | 0.05 |  | 0.022 |  |
| BOD Loading Factor | 0.49 |  | 0.21 |  |
| Clarifier Effluent* |  |  |  |  |
| nitrate & nitrite | 20 | 87 | 45 | 67 |
| N—H Compounds | 17 | 89 | 4 | 97 |
| TOC | 65 | 94 | 60 | 94 |
| BOD | 13 |  | 11 |  |

*milligrams/liter
**on filtered samples, in milligrams/liter
***(milligrams/liter VSS), VSS = volatile suspended solids.

EXAMPLE IV

Using a feed comprising phenol, thiocyanate and ammonia the process illustrated in FIG. III was operated on a laboratory scale. The recycle rate from the aerobic state to the anaerobic stage, and from the clarifier to the first anaerobic stage were both the same as the feed effluent rate. The results were as follows: The level of phenol in the effluent from the first anaerobic stage was less than 1 milligram/liter.

TABLE IV

| Time (days) | 16 |
|---|---|
| Feed* | |
| ammonia | 200 |
| phenol | 75 |
| thiocyanate | 20 |
| TOC | 90 |
| pH | 10–11 |
| Anaerobic Stage* | |
| nitrate & nitrite | 0 |
| N—H Compound | 85 |
| TOC | 32 |
| pH | 6.5–9.0 |
| Sludge Level** | 1125 |
| Aerobic Stage* | |
| nitrate & nitrite | 50 |
| N—H Compounds | 45 |
| TOC | 24 |
| Sludge Level | 980 |
| Second Anaerobic | |
| nitrate & nitrite | 0 |
| N—H Compounds | 23 |
| TOC | 55 |
| Sludge Level | 785 |

*milligrams/liter
**(milligrams/liter VSS), VSS = volatile suspended solids.

Methanol was fed to the second anaerobic stage and the increase in total organic carbon analysis at this stage of the process is due to excessive addition of methanol.

The treatment levels were as follows: ammonia 89%, phenol 100%, thiocyanate 93%, thus showing simultaneous removal of ammonia, phenol and thiocyanate by the process of the present invention.

EXAMPLE V

The process illustrated in FIG. II was operated on a laboratory scale using an aqueous solution of hexamethylene diamine as the feed. The recycle rate from the clarifier to the anaerobic zone was the same as the feed rate. The volatile suspended solids in all runs was in the range 3000–3200 milligrams/liter.

The process was operated for a period of time under a given set of operation conditions. A sample was taken and analyzed. The operating conditions were changed and the procedure was repeated. The period of time is identified in the table of results, Table V, as "length of run".

TABLE V

| Run | 1 | 2 | 3 | 4 | 5 | 6 |
|---|---|---|---|---|---|---|
| Length of Run (days) | 7 | 3 | 4 | 2 | 3 | 1 |
| Feed | | | | | | |
| TKN* | 30 | 30 | 30 | 30 | 30 | 30 |
| TOC | 85 | 85 | 85 | 85 | 85 | 85 |
| BOD | 200 | 200 | 200 | 200 | 200 | 200 |
| Anaerobic Stage | | | | | | |
| nitrate | 0.2 | TR | TR | TR | 0.1 | TR |
| nitrite | TR | TR | TR | TR | TR | TR |
| TKN | 10.3 | 10.6 | 11.2 | 11.2 | 8.7 | 11.2 |
| TOC | 25 | 33 | 14 | 33 | 22 | 19 |
| Nitrogen Loading Factor | 0.075 | 0.075 | 0.04 | 0.04 | 0.075 | 0.075 |
| Aerobic Stage | | | | | | |
| NO$_3$ | 7.2 | 7.1 | 5.3 | 8.0 | 9.0 | 5.7 |
| NO$_2$ | TR | TR | TR | TR | TR | 0.6 |
| TKN | TR | TR | TR | TR | TR | 0.9 |
| TOC | 9 | 12 | 9 | 11 | 8 | 10 |
| BOD Loading Factor | 0.25 | 0.13 | 0.13 | 0.25 | 0.39 | 0.13 |
| Nitrification Loading Factor | 0.04 | 0.02 | 0.02 | 0.04 | 0.06 | 0.02 |
| Clarified Effluent | | | | | | |
| NO$_3$ | 8.0 | 7.3 | 4.4 | 7.1 | 9.0 | 5.9 |
| NO$_2$ | TR | TR | TR | TR | TR | TR |
| TKN | TR | TR | TR | TR | TR | TR |
| TOC | 8 | 12 | 9 | 10 | 9 | 11 |
| Treatment Level (nitrogen) | 73 | 76 | 85 | 75 | 70 | 80 |

*Total Kjeldahl Nitrogen
TR trace, less than 0.1 milligrams/liter.

EXAMPLE VI

To demonstrate the process of the present invention on a feed more closely resembling sewage, the process illustrated in FIG. II was operated on a laboratory scale using an aqueous nutrient broth solution. The approximate composition of this solution was as follows:

| Nutrient broth | 200 mg./l. |
|---|---|
| Glucose | 180 mg./l. |
| Phosphorous | 10 mg./l |
| BOD | 250 mg./l. |
| TOC | 220 mg./l. |
| TKN | 32 mg./l. |

The recycle rate from the clarifier to the a anaerobic zone was the same as the feed effluent rate. The volatile suspended solids in all runs was in the range 1300–3300 milligrams/liter.

The results are reported in Table VI. In runs 3 and 4 of Table VI measurements are reported for different periods of time in the run, the periods of time being measured from the commencement of the run. The bacteria used in run 4 were in the form of sludge acquired from a city sewage treatment plant. In the other runs the bacteria had been used in other effluent treatment processes of the present invention.

TABLE VI

| Run | 1 | 2 | 3A | 3B | 4A | 4B | 4C |
|---|---|---|---|---|---|---|---|
| Length of Run (days) | 9 | 9 | 5 | 20 | 7 | 15–19 | 29–36 |
| Feed | | | | | | | |
| TKN | 30.9 | 30.9 | 34.6 | 30.2 | 31.0 | 31.0 | 29.1 |
| TOC | 187 | 211 | 210 | 221 | 220 | 200 | 228 |
| BOD | 213 | 241 | 239 | 251 | 250 | 228 | 259 |
| Anaerobic Stage | | | | | | | |
| nitrate | TR | TR | 0.1 | 0.2 | 0.1 | TR | 0.1 |
| nitrite | TR | TR | TR | TR | TR | TR | TR |
| TKN | 10.7 | 12.4 | 15.1 | 21.9 | 26.4 | NA | 11.5 |
| TOC | 70 | 78 | 102 | 101 | 94 | 50 | 85 |
| Nitrogen Loading Factor | 0.038 | 0.15 | 0.2 | 0.15 | 0.038 | 0.047 | 0.043 |
| Aerobic Stage | | | | | | | |
| nitrate | 3.1 | 0.5 | 0.6 | 0.4 | 1.4 | 14.0 | 2.8 |
| nitrite | 0.15 | 0.16 | 0.7 | TR | 8.8 | 0.6 | 0.3 |
| TKN | 0.1 | 2.3 | 1.9 | 11.0 | 19.5 | TR | TR |
| BOD Loading Factor | 0.11 | 0.54 | 0.68 | 0.63 | 0.15 | 0.16 | 0.13 |
| Nitrification Loading Factor | 0.016 | 0.069 | 0.010 | 0.074 | 0.018 | 0.021 | 0.017 |

TABLE VI-continued

| Run | 1 | 2 | 3A | 3B | 4A | 4B | 4C |
|---|---|---|---|---|---|---|---|
| Clarifier | | | | | | | |
| nitrate | 3.2 | 0.5 | 0.6 | 0.3 | 0.8 | 14.5 | 3.4 |
| nitrite | 0.1 | 0.1 | 0.7 | 0.2 | 5.7 | TR | 0.1 |
| TKN | 0.1 | 1.7 | 3.9 | 12.2 | 20.9 | 0.1 | TR |
| TOC | 12 | 12 | 20 | 21 | 25 | 17 | 20 |
| Treatment Level | | | | | | | |
| (nitrogen) % | 89 | 93 | 85 | 58 | 12 | 53 | 88 |

Run 4 illustrates acclimation of the bacteria in the sludge acquired from a city sewage treatment plant.

I claim:

1. A process for the treatment of aqueous wastes containing nitrogenous matter selected from the group consisting of nitrate and nitrite ions and matter capable of forming nitrate or nitrite ions comprising (a) passing the aqueous waste having a pH less than about 6, a substantial portion of the acidic component of the waste being nitrogenous matter, through an anaerobic treatment zone at a rate such that (1) the concentration of nitrogen in the form of nitrate and nitrite ions in the anaerobic zone is less than about 3 milligrams/liter, and (2) the BOD loading factor of the effluent therefrom is less than 0.25 lb BOD/lb of volatile suspended solids, the anaerobic treatment zone having a pH of at least about 6 and containing acclimatized anaerobic activated sludge and sufficient carbonaceous matter to obtain substantially complete denitrification of the aqueous waste, (b) passing denitrified effluent therefrom to an aerobic treatment zone wherein said matter capable of forming nitrates and nitrites is substantially all converted to nitrates and nitrites and (c) separating and recycling a mixture of sludge and effluent from the aerobic treatment zone to the anaerobic treatment zone at a rate at least as high as the feed rate of aqueous waste to the anaerobic treatment zone.

2. The process of claim 1 wherein the concentration of nitrogen in the form of nitrate and nitrite ions in the anaerobic treatment zone is less than about 1 milligram/liter.

3. The process of claim 1 in which the loading of reduced nitrogen compound in the feed to the aerobic treatment zone is less than about 0.1 lb of reduced nitrogen per lb of volatile suspended solids per day.

4. The process of claim 1 wherein the aqueous waste is introduced into the anaerobic zone at a rate not greater than about 0.7 lb of nitrogen in the aqueous waste per pound of volatile suspended solids per day.

* * * * *